United States Patent Office 2,927,108
Patented Mar. 1, 1960

2,927,108

3,20-BIS-KETALS OF CORTISONE

Eugene P. Oliveto, Bloomfield, David H. Gould, Palisades Park, and Temple Clayton, Parsippany, N.J., assignors to Schering Corporation, Bloomfield, N.J., a corporation of New Jersey No Drawing. Application June 4, 1952
Serial No. 291,782

2 Claims. (Cl. 260—239.55)

The present invention relates to an improved process for the selective and partial reduction of saturated and unsaturated pregnan-21-ol-11-ones, of both the normal and allo-series in the case of the saturated compounds, the compounds having an additonal keto group in one or in both of the 3- and 20-positions, and to the intermediates obtained in the course of manufacture thereof.

It is a general object of the invention to provide an improved procedure for the selective reduction of pregnan-21-ol-11-ones having a keto group also in at least one of the 3- and 20-positions to produce 3- and/or 20-keto-11β,21-dihydroxypregnanes (the term "pregnane" being used herein to include both the saturated and unsaturated compounds except where otherwise expressly limited), such compounds having either hydrogen or hydroxyl in the 17α-position.

It is also an object of the invention to provide an improved method for the protection of the 3- and 20- keto groups of 21-hydroxy-3-and/or 20,11-polyketopregnanes while effecting reduction of the 11-keto group.

A still further object of the invention is to provide new intermediates in the form of cycloketal (dioxolane) derivatives of 21-hydroxy pregnanones, certain of which have been found by us to possess physiological activity, and which are suitable generally for the manufacture of steroid hormones of various kinds and their derivatives.

A still further object of the invention is to provide 11β,21-dihydroxypregnanones of the cortical hormone seres and compounds related thereto from the corresponding 11-keto-21-hydroxypregnanones (having an additional keto group or groups in the 3- and/or 20-positions), in a simple and efficient manner.

Other objects of the invention will appear from the detailed description thereof hereinafter.

We have found that 1,2-glycols of different types will condense selectively with 3- and 20-keto groups of 11-keto-21-hydroxypregnanes having a keto group in at least one of the 3- and 20-positions, to form cyclic ketal or dioxolane groups of quite stable character, but that such 1,2-glycols will not react with an 11-keto group, so that after protection of the 3- and/or 20-keto groups by reaction with the 1,2-glycols, the 11-keto group can be selectively reduced under mild acid or under neutral or basic conditions to form 11-hydroxy groups. What has been said in connection with the 11-keto group applies also to a 12-keto group. After such reduction the cycloketal group of groups can be split off to restore the 3- and/or 20-keto groups. When this mode of protecting the 3- and 20-keto groups is applied to, for example, cortisone and other polyketo cortical steroids, valuable steroids having hormone activity or convertible into steroid hormones can be conveniently manufactured in good yield. Moreover, some of the reduced and unreduced cycloketal or dioxolane derivatives have themselves been found to possess physiological activity in dosages of the order of those common with cortical steroids.

In carrying out our invention, 21-hydroxy-3 and/or 20,11- (or 12-) polyketo pregnanes are reacted with an aliphatic or cyclo aliphatic 1,2-glycol to protect or block the 3- and/or 20-keto groups to prevent reduction of the same during the subsequent reduction of the 11- (or 12-) keto group. We prefer to form the dioxolane derivatives by reacting the 21-hydroxy-polyketopregnan with ethylene glycol, but other 1,2-glycols can be employed in analogous procedures, such as 1,2-propylene glycol, 1,2-butylene glycol, 1,2-cyclohexanediol, etc. The so-protected compounds are then subjected to the action of a reducing agent under mildly acid or under neutral or alkaline conditons to convert the 11- (or 12-) keto group into a secondary alcohol group, care being taken to avoid conditions which may split off the protecting dioxolane groups, such as the presence of strong mineral acid, or heating under acid conditions. This reduction can be carried out, for example, with metal hydrides (such as sodium borohydride, lithium borohydride and sodium or lithium aluminum hydride). When the reduction is complete, the protecting group at C–3 and/or C–20 is removed, hydrolysis under acid conditions being quite rapid.

The preferred starting compounds of our process fall within the following general formula, the same including compounds of both the normal and allo-series (in the case of the nuclearly saturated compounds):

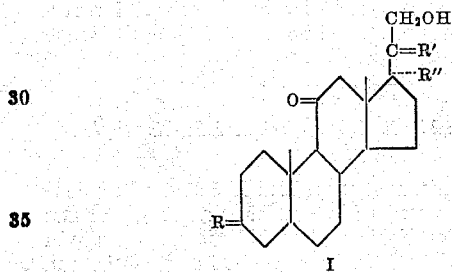

I wherein R and R' are each O=,

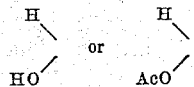

at least one of them, however, being O=, Ac standing for the acyl group of an organic carboxylic acid, either aliphatic or aromatic, such as acetyl, propionyl, valeryl, benzoyl, etc. (such acyl group being, however, usually hydrolyzed during the splitting of the cycloketal derivative); R" is H or OH; the unsaturated compounds having a double bond attached to the 5 carbon (in the 4,5-position in the case of the 3-keto, and in the 5,6-position in the case of the 3-hydroxy compounds).

The cycloketals (dioxolanes) produced by our process have the following general formula:

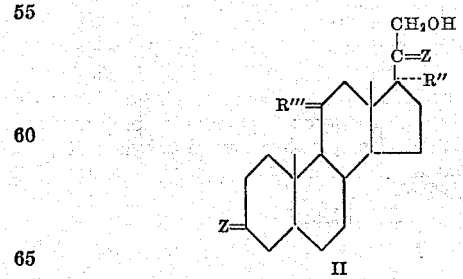

II

The final, partially reduced products of our process are of the same general formula as indicated by I, except that the 11-keto (or 12-keto) group is replaced by a secondary alcohol group, while the nuclear double bond in the case of unsaturated starting compounds may have saturated, depending on the mode of reduction employed.

The following equations illustrate generally the reactions involved in our process:

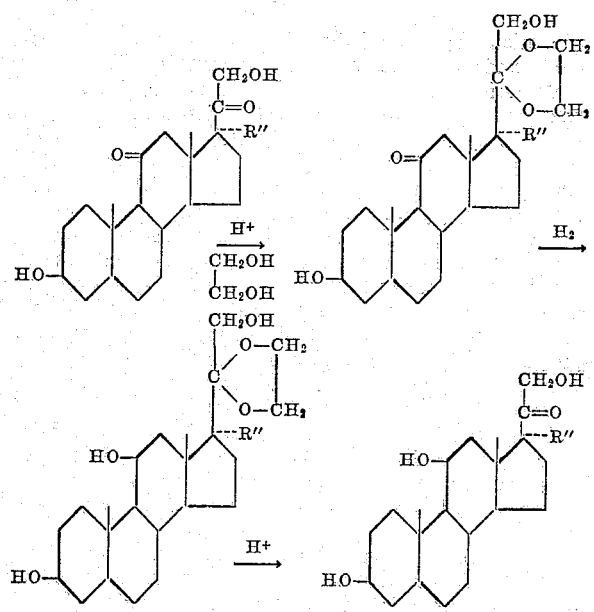

The invention will be further described in more detail in the following examples which are presented for purposes of illustration only and not as indicating the scope of the invention:

EXAMPLE 1

Δ⁴-pregnen-17α,21-diol-3,11,20-trione-3,20-bis ethylene ketal

Four g. of cortisone is suspended in 60 cc. of ethylene chloride and is treated with 6 cc. of ethylene glycol and 0.1 g. of methyl sulfonic acid. The mixture is refluxed 36 hours, with the water being trapped as it distils out. The solution is neutralized with pyridine and washed with water. The semi-crystalline residue obtained on evaporation is crude cortisone-3,20-bis-spirodioxolane, which is digested in acetone, chilled and filtered off. M.P. 230–235° C.

EXAMPLE 2

Δ⁴-pregnen-11β,17α,21-triol-3,20-dione-bis-ethylene ketal

The bis-ketal of pregnendioltrione from Example 1 is suspended in alkaline methanol and treated with 2 g. of NaBH₄. The mixture is stirred one hour and refluxed 18 hours. The solution is concentrated in vacuo, and treated with acetone and water to obtain the crystalline 3,20 bis-spirodioxolane of 17-hydroxy corticosterone (Kendall's compound F).

EXAMPLE 3

Δ⁴-pregnen-11β,17α,21-triol-3,20-dione

The bis-ketal of pregnentrioldione from Example 2 is treated with 5 volumes of 50% acetic acid and refluxed ½ hour. The mixture is diluted with water to obtain crude 17α-hydroxy corticosterone (Kendall's compound F), M.P. 200–212°. Recrystallized from ethylacetate, the product melted at 215–218°.

EXAMPLE 4

Δ⁴-pregnen-11β,17α,21-triol-3,20-dione-21-acetate

The crude pregnentrioldione of Example 3 is acetylated with 10 volumes of pyridine and 2 volumes of acetic anhydride at 5° C. overnight. Crystalline compound F acetate (4-pregnen-11β,17α,21-triol-3,20-dione-21-acetate) is obtained by water precipitation. This may be crystallized from ethyl acetate to give the product of M.P. 218–221°.

EXAMPLE 5

Δ⁴-pregnen-21-ol-3,11,20-trione-3,20-bis ethylene ketal

One g. of Δ⁴-pregnen-21-ol-3,11,20-trione (Kendall's compound A) is dissolved in 60 ml. of toluene and treated with 2 ml. of ethylene glycol and 0.02 g. of benzene sulfonic acid. The mixture is refluxed 10 hours, while the distillate is trapped in a Dean-Stark tube to remove water. The solution is washed with dilute sodium hydroxide and dried over sodium sulfate. The crude product obtained on evaporation is chromatographed from ether on magnesium silicate to obtain the pure crystalline bis ketal.

EXAMPLE 6

Δ⁴-pregnen-11β,21-diol-3,20-dione-3,20-bis ethylene ketal

The bis ketal of pregnenoltrione (0.5 g.) from Example 5 is dissolved in 20 ml. of dry tetrahydrofuran and treated with 0.5 g. of lithium aluminum hydride. The mixture is refluxed 1 hr. and then carefully treated with sufficient 80% aqueous tetrahydrofuran (5 ml.) to decompose the aluminate salts. After being boiled 30 min., the mixture is filtered, and evaporation of the filtrate gives the bis-ketal of pregnendioldione which may be crystallized from methanol with a trace of pyridine.

EXAMPLE 7

Δ⁴-pregnen-11β,21-diol-3,20-dione

The bis-ketal of pregnendioldione from Example 6 is boiled 15 min. with 5 volumes of 75% acetic acid, diluted further with water and chilled to give the product, corticosterone. It may be recrystallized from acetone, M.P. 178–180°.

EXAMPLE 8

Δ⁴-pregnen-11β,21-diol-3,20-dione-21-acetate

We prefer for purification to acetylate the crude corticosterone of Example 7 with 5 volumes of pyridine and 2 volumes of acetic anhydride at room temperature. Careful addition of water gives the crystalline corticosterone acetate which is recrystallized from ethyl acetate, M.P. 143–150°.

EXAMPLE 9

Pregnan-17α,21-diol-3,11,20-trione-3,20-bis-ethylene ketal

One g. of pregnan-17α,21-diol-3,11,20-trione is suspended in 20 ml. of ethylene chloride and treated with 2 ml. of ethylene glycol and 0.03 g. of p-toluene sulfonic acid. The mixture is refluxed 8 hrs. and worked up as in Example 1. The crude bis ketal is purified by chromatography from benzene on alumina, eluting with 0.2% methanol in benzene and crystallizing from methanol.

EXAMPLE 10

Pregnan-11β,17α,21-triol-3,20-dione-bis ethylene ketal

The bis-ketal of pregnandioltrione from Example 9 is treated with one part of lithium borohydride in 20 volumes of ether and refluxed 14 hrs. Water is added to decompose the borates and the ether layer is dried and evaporated to dryness. The crystalline residue is the crude product which may be recrystallized from methanol and a trace of pyridine.

EXAMPLE 11

Pregnan-11β,17α,21-triol-3,20-dione-21-acetate

One-half gram of the bis ketal of pregnantrioldione from Example 10 is boiled with 4 volumes of 75% acetic acid for 15 min. More water and chilling gives the crude pregnan-triol-dione, M.P. 200–210°. We prefer to acetylate with 5 volumes of pyridine and 1 volume of acetic anhydride and work up as in Example 8 to obtain the crystalline pregnan-11β,17α,21-triol-3,20-dione-21-acetate, M.P. 218–220°.

By similar reactions, the mono-dioxolanes of pregnan-3,17α,21-triol-11,20-diones, pregnan-17α,20,21-triol-3,11- diones, pregnan-3,21-diol-11,20-diones, pregnan-20,21-diol-3,11-diones, as well as the bis-cycloketals (bis-dioxolanes) of pregnan-21-ol-3,11,20-diones can be prepared, the term "pregnan," as already indicated, including both the saturated and unsaturated compounds.

We claim:
1. 3,20-di-cycloketal derivatives of cortisone of the formula

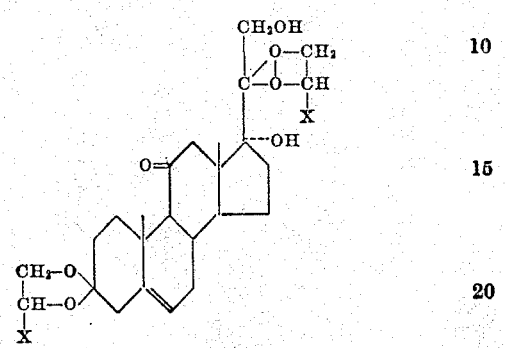

wherein X is a member of the group consisting of hydrogen, methyl, ethyl and cyclohexyl.

2. Cortisone-3,20-bis-ethylene glycol cycloketal.

References Cited in the file of this patent

UNITED STATES PATENTS

| | | |
|---|---|---|
| 2,288,854 | Stavely | July 7, 1942 |
| 2,302,636 | Koster | Nov. 17, 1942 |
| 2,356,154 | Fernholz | Aug. 22, 1944 |
| 2,599,481 | Plattner | June 3, 1952 |
| 2,622,081 | Bernstein | Dec. 16, 1952 |

FOREIGN PATENTS

| | | |
|---|---|---|
| 234,924 | Switzerland | Mar. 1, 1945 |
| 236,519 | Switzerland | July 2, 1945 |

FOREIGN PATENTS

J. Amer. Chem. Soc., vol. 71, pages 122–5 (1949).
Feiser and Feiser: "Natural Products Related to Phenanthrene," 3rd edition, 1949, pages 451, 435, 425 and 407.